United States Patent
O'Neil et al.

(10) Patent No.: US 12,385,210 B2
(45) Date of Patent: Aug. 12, 2025

(54) ADDITIVE MANUFACTURING OF TUBULAR JOINTS

(71) Applicant: Lincoln Global, Inc., Santa Fe Springs, CA (US)

(72) Inventors: Bryan M. O'Neil, Double Oak, TX (US); David M. Douglass, Bay Village, OH (US); Michael S. Flagg, Aurora, OH (US); Bradley K. Barnhart, Seven Hills, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 413 days.

(21) Appl. No.: 17/732,677

(22) Filed: Apr. 29, 2022

(65) Prior Publication Data

US 2023/0091609 A1 Mar. 23, 2023

Related U.S. Application Data

(60) Provisional application No. 63/246,380, filed on Sep. 21, 2021.

(51) Int. Cl.
*E02D 27/52* (2006.01)
*B33Y 10/00* (2015.01)
(Continued)

(52) U.S. Cl.
CPC .............. *E02D 27/52* (2013.01); *B33Y 10/00* (2014.12); *B33Y 80/00* (2014.12); *E02D 27/425* (2013.01);
(Continued)

(58) Field of Classification Search
CPC ... E02D 27/52; E02D 27/425; E02B 17/0004; F03D 13/25; B33Y 10/00; B33Y 80/00
See application file for complete search history.

(56) References Cited

U.S. PATENT DOCUMENTS 3,967,457 A * 7/1976 Lovie .................. E02B 17/0004
 74/29
4,648,750 A * 3/1987 Horton .................. E02B 17/027
 405/203

(Continued)

FOREIGN PATENT DOCUMENTS

BR 102014013828-5 A2 12/2016
GB 2205915 * 12/1988
(Continued)

OTHER PUBLICATIONS

Rushford; "Exploring Possibilities for Scaled Testing of Offshore Jacket Structures via 3D Printing;" https://digitalcommons.usm.maine.edu/thinking-matterssymposium/2021/oral presentations/44/; Dated Apr. 15, 2021; p. 1.

(Continued)

*Primary Examiner* — Sean D Andrish
(74) *Attorney, Agent, or Firm* — Brad C. Spencer

(57) ABSTRACT

A tubular joint includes a tubular substrate extending along an axis. The substrate has a first inner diameter. A first tubular brace member is additively manufactured on the substrate and is connected thereto at a proximal end of the first tubular brace member. A second tubular brace member is additively manufactured on the substrate and is connected thereto at a proximal end of the second tubular brace member. At respective distal ends of the brace members, the first tubular brace member and the second tubular brace member have a circular cross-sectional shape having a distal wall thickness and a second inner diameter that is smaller than the first inner diameter. At the proximal ends the of brace members, the first tubular brace member and the second tubular brace member have respective proximal wall thicknesses that are greater than the distal wall thickness.

13 Claims, 10 Drawing Sheets

(51) Int. Cl.
 *B33Y 80/00* (2015.01)
 *E02D 27/42* (2006.01)
 *F03D 13/20* (2016.01)
 *F03D 13/25* (2016.01)
(52) U.S. Cl.
 CPC ............ *F03D 13/22* (2016.05); *F03D 13/25* (2016.05); *E02D 2200/1685* (2013.01); *E02D 2300/0029* (2013.01)

(56) References Cited

U.S. PATENT DOCUMENTS

| | | | |
|---|---|---|---|
| 9,896,860 B2* | 2/2018 | Bucknell | E02B 17/0004 |
| 9,975,179 B2 | 5/2018 | Czinger et al. | |
| 10,557,732 B2 | 2/2020 | Gottlieb et al. | |
| 10,988,909 B1 | 4/2021 | Cotrell | |
| 2016/0216145 A1* | 7/2016 | Berberig | B23K 20/129 |
| 2017/0001368 A1 | 1/2017 | Czinger et al. | |
| 2018/0021890 A1 | 1/2018 | Griffith et al. | |
| 2018/0050426 A1* | 2/2018 | Sigl | B23K 9/02 |
| 2019/0134894 A1* | 5/2019 | Vadder | B23P 15/26 |

FOREIGN PATENT DOCUMENTS

| | | |
|---|---|---|
| WO | 2021/032699 A1 | 2/2021 |
| WO | 2021/033039 A1 | 2/2021 |

OTHER PUBLICATIONS

Moon, et al.; "Uncertainty quantification and statistical model validation for an offshore jacket structure panel given imited test data and simulation model;" Structural and Multidisciplinary Optimization; https://doi.org/10.1007/s00158-020-02520-8; Published Feb. 18, 2020; pp. 1-14.

Chen, et al.; "Seam tracking of large pipe structures for an agile robotic welding system mounted on scaffold structures;" Robotics and Computer-Integrated Manufacturing 000 (2017); https://doi.org/10.1016/j.rcim.2017.09.018; Dated Oct. 6, 2017; pp. 1-14.

Melfi; "Additive Manufacturing: Code Implications of Making Components from Weld Metal;" https://www.nationalboard.org/SiteDocuments/General%20Meeting/2021_Melfi.pdf; NBBI 89th General Meeting; Dated May 10, 2021; pp. 1-20.

* cited by examiner

ADDITIVE MANUFACTURING OF TUBULAR JOINTS

CROSS-REFERENCE TO RELATED APPLICATIONS

The present application claims priority to U.S. Provisional Patent Application Ser. No. 63/246,380 filed on Sep. 21, 2021, the disclosure of which is incorporated herein by reference.

BACKGROUND OF THE INVENTION

Field of the Invention

The present invention relates to the fabrication of metal structural joints formed by tubes, such as so-called T, K, Y and X joints or connections (also referred to as nodes).

Description of Related Art

Steel structures such as offshore wind tower jackets or oil drilling jackets and floating offshore wind foundations for example, can include dozens or hundreds of joints between tubular chord and brace members of the structure, which is commonly referred to as a "jacket" or "fixed jacket" foundation. Such joints between chord and brace members of a jacket are known as T, K, Y, X, etc. joints (referred to hereinafter as "TKY joints"). Forming TKY joints from tubular metal, such as steel tubes, involves a time-consuming and labor intensive manual welding process that is typically performed by highly skilled welders since proper fabrication of the joints is necessary to ensure the structural integrity of the jacket. The construction of a wind tower jacket or oil drilling jacket could require the use of hundreds of skilled welders and fitters. It would be desirable to reduce the fabrication time of TKY joints to reduce their construction costs and improve their consistency and structural characteristics (e.g., stress concentrations).

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a tubular joint for a jacket structure. The tubular joint includes a tubular substrate extending along an axis, wherein the tubular substrate has a first inner diameter. A first tubular brace member is additively manufactured on the tubular substrate and is connected to the tubular substrate at a proximal end of the first tubular brace member. A second tubular brace member is additively manufactured on the tubular substrate and is connected to the tubular substrate at a proximal end of the second tubular brace member. At respective distal ends of the first tubular brace member and the second tubular brace member, the first tubular brace member and the second tubular brace member have a circular cross-sectional shape having a distal wall thickness and a second inner diameter that is smaller than the first inner diameter. At the proximal end the of the first tubular brace member and at the proximal end of the second tubular brace member, the first tubular brace member and the second tubular brace member have respective proximal wall thicknesses that are greater than the distal wall thickness.

In accordance with another aspect of the present invention, provided is a tubular joint for a jacket structure. The tubular joint includes a tubular substrate extending along an axis, wherein the tubular substrate has a first inner diameter. A first tubular brace member is additively manufactured on the tubular substrate and is connected to the tubular substrate at a proximal end of the first tubular brace member. A second tubular brace member is additively manufactured on the tubular substrate and is connected to the tubular substrate at a proximal end of the second tubular brace member. At respective distal ends of the first tubular brace member and the second tubular brace member, the first tubular brace member and the second tubular brace member have cylindrically-shaped outer surfaces and respective inner diameters that are smaller than the first inner diameter. At said proximal end the of the first tubular brace member and at said proximal end of the second tubular brace member, respective portions of the outer surfaces of the first tubular brace member and the second tubular brace member are flared outward.

In accordance with another aspect of the present invention, provided is a method of fabricating a tubular joint. The method includes the step of providing a tubular substrate extending along an axis, wherein the tubular substrate has a first inner diameter. A tubular brace member is additively manufactured on the tubular substrate. The tubular brace member is attached to the tubular substrate at a proximal end of the tubular brace member. At a distal end of the tubular brace member, the tubular brace member has a second inner diameter that is smaller than the first inner diameter. At said distal end, the tubular brace member has a first wall thickness and an outer surface having a circular cross-sectional shape, and at said proximal end, the tubular brace member has a second wall thickness that is greater than the first wall thickness.

In accordance with another aspect of the present invention, provided is a method of fabricating a jacket structure. The method includes the step of providing a tubular chord member of the jacket structure. The tubular chord member extends between a first end and a second end. A first TKY joint is formed on the first end of the tubular chord member, and a second TKY joint is formed on the second end of the tubular chord member. The step of forming the first TKY joint includes additively manufacturing a first tubular brace member, and the step of forming the second TKY joint includes additively manufacturing a second tubular brace member. The step of forming the first TKY joint and the step of forming the second TKY joint can occur simultaneously.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
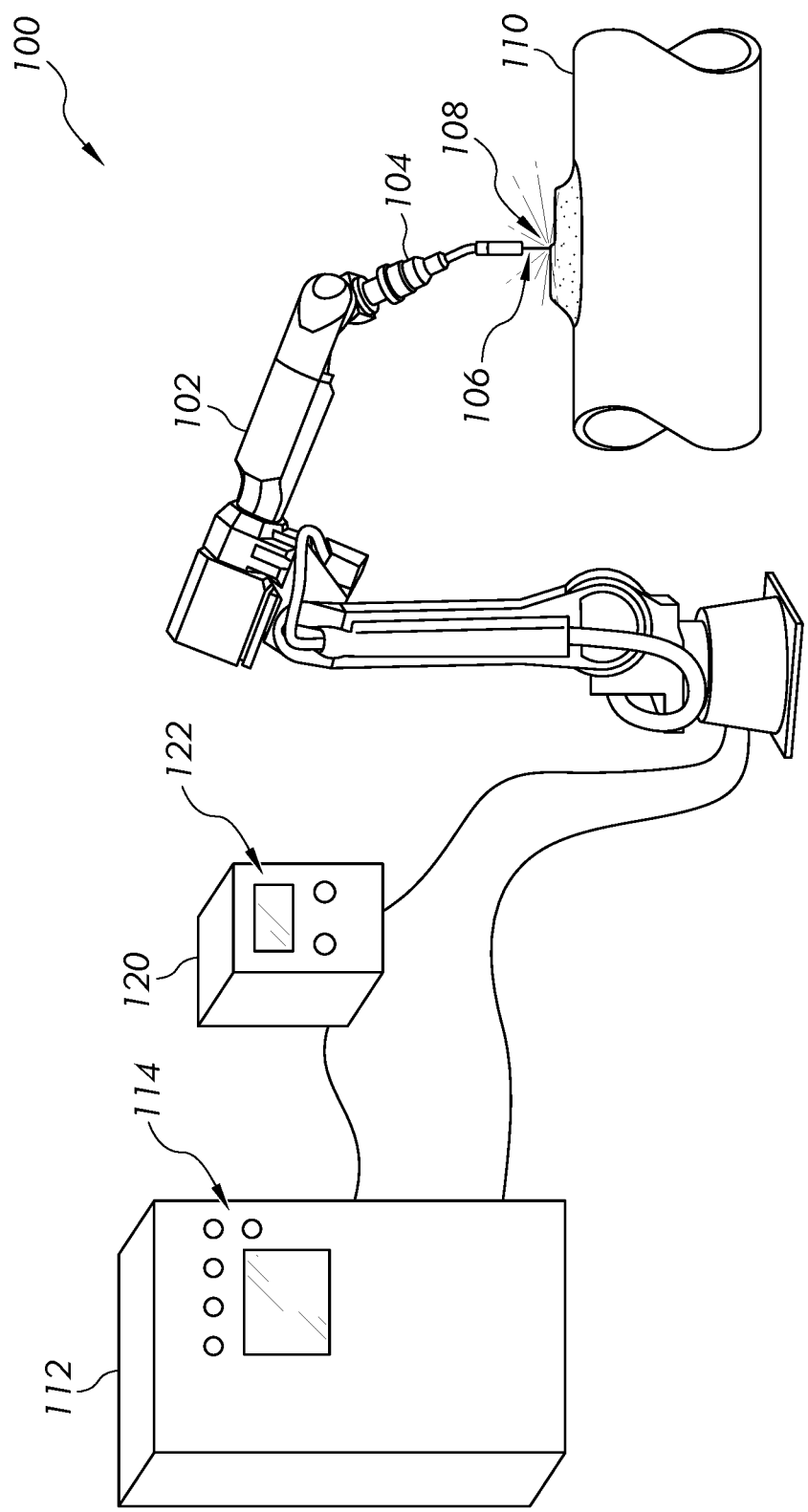
FIG. 1 shows an example additive manufacturing system.

The present invention relates to the additive manufacturing of TKY joints. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of a metal deposition additive manufacturing apparatus or system may include, for example, at least one of a laser-based subsystem, a plasma based subsystem, an arc based subsystem, an electron beam based subsystem, or an electric resistance based subsystem, for example, to deposit a metal material by melting a metal wire. Furthermore, some embodiments of a metal deposition apparatus may include, for example, a wire delivery or feeding system to feed/deliver a consumable metal wire to additively manufacture a 3D part on a base or substrate. Also, some embodiments of a metal deposition apparatus may include, for example, kinematic control elements (e.g., robotics) or other types of control elements (e.g., optical control elements) to move a laser beam, a plasma beam, an electric arc, an electron beam, or a consumable metal wire with respect to a 3D part being additively manufactured on a base or substrate FIG. 1 shows an example metal additive manufacturing system 100. The system 100 can build up a metal part layer by layer on a substrate using 3D printing or wire additive manufacturing techniques to form a desired 3D structure on the substrate. The system 100 employs a single or multi-wire (e.g., twin wire) welding process, such as gas metal arc welding (GMAW), flux-cored arc welding (FCAW), metal-cored arc welding (MCAW), gas-tungsten arc welding (GTAW), etc., to 3D print the desired structure on the substrate.

The example additive manufacturing system 100 can include a robot 102 that operates an electric arc torch 104 (e.g., an arc welding torch). The robot 102 can be a six-axis articulating industrial robot, or another type of robot known in the art. The torch 104 can include an electrode 106, such as a consumable wire electrode, through which an arc 108 is generated between the torch and a substrate 110. The robot 102 controls the movements of the torch 104 during the additive manufacturing operation to 3D print the desired structure or part on the substrate 110 according to a programmed printing or deposition sequence. In particular, the robot 102 controls the movements of the torch 104 based on control instructions from a computer-based robot controller 112. The control instructions can be based on a stored 3D model of the part to be printed, such as a CAD file for example. The 3D model can be translated to a language (e.g., computer code) that is usable by the robot controller 112 and robot 102 to control the movements of the torch 104 to print the part. The robot controller 112 can include a processor, memory, and user interface 114. The memory (e.g., a non-transitory computer-readable storage medium) can store programmed instructions that when executed by the processor causes the robot controller 112 to perform the functionality ascribed to it herein. In certain embodiments, the robot controller 112 can execute path planning software that determines appropriate torch movements for printing the desired part from the 3D model of the part.

The system 100 further includes a welding power supply 120. The welding power supply 120 provides an electrical power output to the torch 104 to generate the arc 108. The welding power supply 120 converts input electrical power (e.g., utility power) into a suitable arc waveform (e.g., a welding waveform) for performing the additive manufacturing operation. The power supply 120 can include electronic circuitry (e.g., PWM inverters, choppers, etc.) for generating a desired arc welding waveform. The power supply 120 can further include a processor, memory, and a user interface 122 for adjusting various parameters of the deposition operation (e.g., voltage, current, wire feed speed, AC balance, etc.) and for controlling the welding waveform during additive manufacturing. FIG. 1 shows an example of a wire-based additive manufacturing system. However, the present invention is not limited to wire-based additive manufacturing systems and would include other metal additive manufacturing systems, such as thermal spray additive manufacturing systems and blown powder metal additive manufacturing systems for example.

Figure 2C:
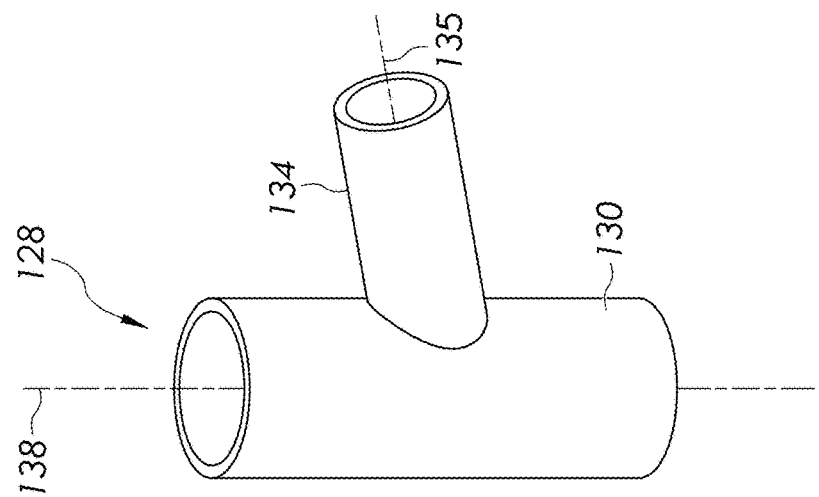
FIG. 2C shows an example Y joint.
Figure 2B:
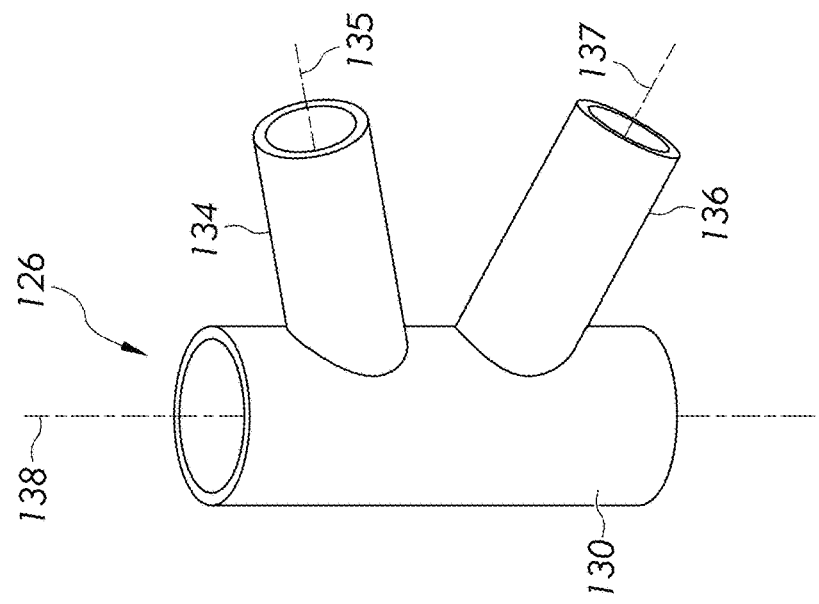
FIG. 2B shows an example K joint.
Figure 2A:
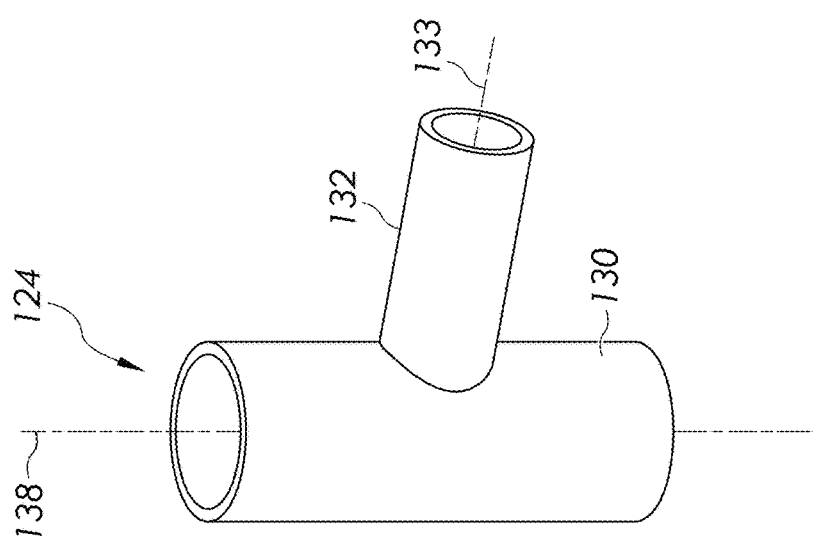
FIG. 2A shows an example T joint.

As noted above, the present invention relates to the additive manufacturing of TKY joints. The additively-manufactured joints can be welded to other members to form larger structures, such as jackets for wind towers or oil drilling rigs. FIGS. 2A, 2B, and 2C show example TKY joints that can be additively manufactured using 3D metal printing techniques. The TKY joints are shown as being formed by cylindrical tubes, such as steel tubes, but the TKY joints could have various, typically tubular, shapes and the joint members need not have cylindrical cross-sections. For example, the TKY joints could be formed from square tubing. The TKY joints could also be formed from metals other than steel, such as aluminum, stainless steel, or nickel alloys for example. A T joint 124, a K joint 126, and a Y joint 128 are shown respectively in FIGS. 2A, 2B, and 2C. All of the joints include a chord member 130 and one or more brace members 132, 134, 136. The outer and inner diameters of the chord member 130 are respectively larger than the outer and inner diameters of the brace members 132, 134, 136. However, in further example embodiments, the diameters of the chord member 130 can be the same as or smaller than the diameters of the brace members 132, 134, 136. The chord 130 extends along an axis 138, and the brace members 132, 134, 136 extend along respective axes 133, 135, 137 that may be perpendicular to the axis 138 of the chord or oriented at an acute/obtuse angle with respect to the axis 138 of the chord. The axis 138 of the chord 130 is substantially perpendicular to the axis 133 of the brace 132 in the T joint 124, whereas the axis 138 of the chord and axes 135, 137 of the braces 134, 136 form acute/obtuse angles in the K joint 136 and Y joint 128.

Figure 3C:
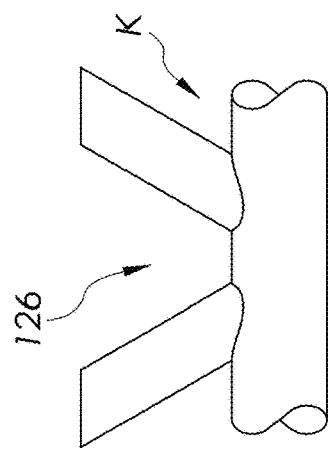
FIG. 3C shows an example K joint.
Figure 3F:
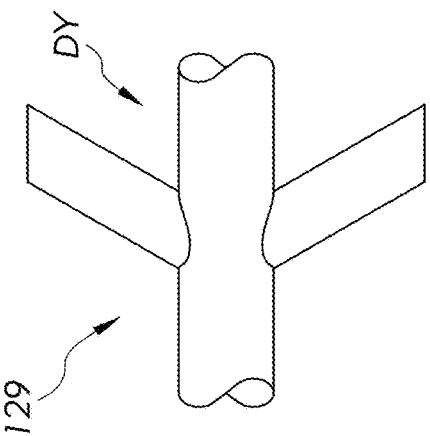
FIG. 3F shows an example DY joint.
Figure 3B:
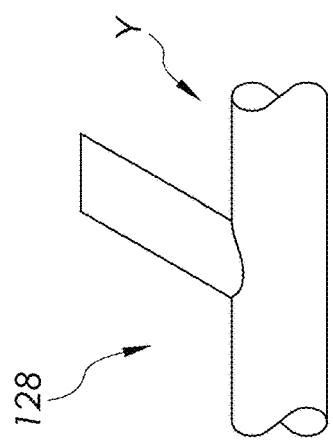
FIG. 3B shows an example Y joint.
Figure 3E:
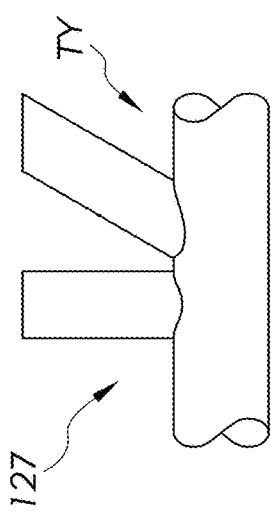
FIG. 3E shows an example TY joint.
Figure 3A:
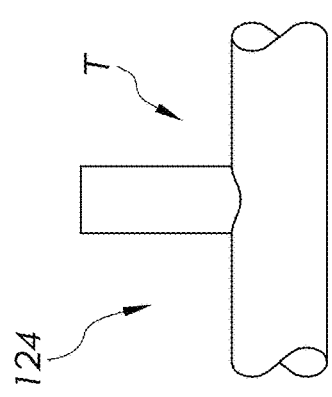
FIG. 3A shows an example T joint.
Figure 3D:
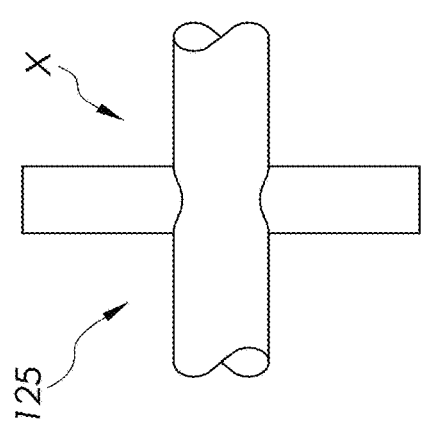
FIG. 3D shows an example X joint.

If desired, the entirety of the TKY joints 124, 126, 128 can be additively manufactured and then attached (e.g., welded) to other tubular members to form a larger structure such as a jacket structure. However, the TKY joints 124, 126, 128 can be additively manufactured more quickly if a length of tube, in particular the chord member 130, is used as a tubular substrate and the brace members 132, 134, 136 additively manufactured on the substrate to form the joint. The present invention is not limited to fabricating TKY joints and would be applicable to any similar type of joint having chord and/or brace members. FIGS. 3A, 3B, and 3C show a T joint 124, a Y joint 128, and a K joint 126, respectively. FIGS. 3D, 3E, and 3F respectively show further example TKY joint configurations (X joint 125, TY joint 127, and DY joint 129) that could be partially or entirely additively manufactured.

Figure 4:
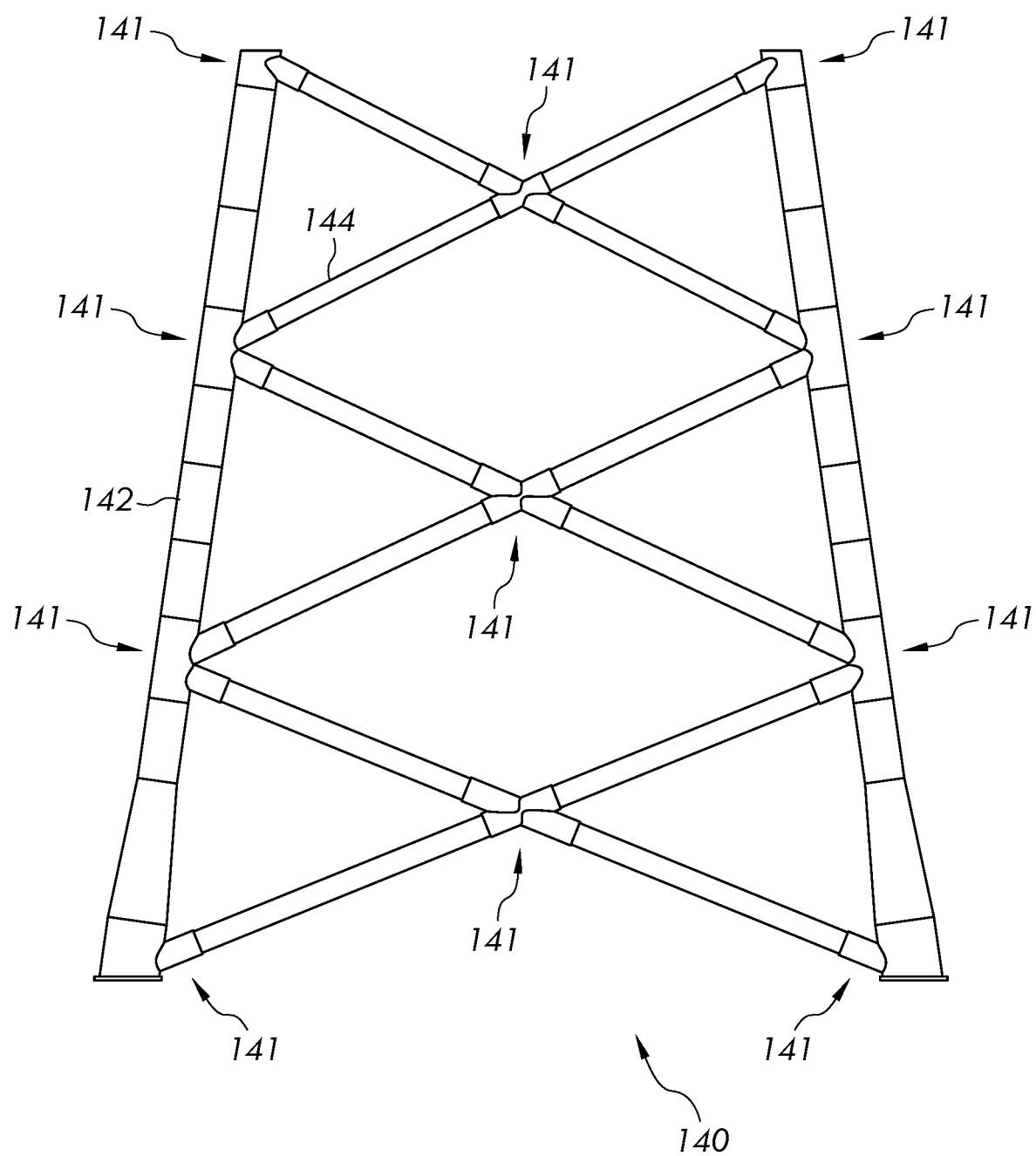
FIG. 4 shows a portion of a jacket structure.

FIG. 4 shows a portion of an example jacket structure 140 that can be constructed using the TKY joints discussed herein. The TKY joints 141 are attached (e.g., welded) to chord 142 and/or brace 144 members of the jacket 140. The outer TKY joints include brace members extending from a chord member, whereas the central TKY joints include only brace members. Offshore wind tower jackets have unique welding requirements that differ from conventional oil & gas jackets. The most noticeable is the use of nodal connections that conventionally can require welding from the inside and outside on the TKY joints in different sections and locations of the jacket foundation. Oil and gas platforms traditionally do not have the same requirements as wind tower jackets since they are typically classified as statically loaded structures versus wind towers which have a dynamic load applied (turbine/tower blades rotating). Nevertheless variations in designs of offshore wind jacket foundations will include nodes where inside and outside or only outside welding is required. It should be noted, inside welding may sometimes require the operator to place themselves in part or in whole inside of the node to complete welding, which can be a significant health safety and environmental (HSE) issue according to common industry standards for worker safety. The TKY joints for wind tower jacket structures have conventionally been manually welded from the inside and outside and sometimes just the outside, rather than robotically welded, due to the complexity of the joint and natural variances expected during fit-up. Cutting of the node connections required for the TKY joint, including braces and chords is significant (e.g., with respect to the labor required). Prepping the individual pipes to build TKY joints requires tremendous time for fit-up before tack welding into place. The handling, fit-up and tack welding of the TKY joints can take up a significant amount of time in the overall project schedule when constructing structures using such joints, and is subject to the common mistakes normally associated with misalignment and excessive gaps before welding. Thus, additively manufacturing TKY joints can be a significantly less expensive and faster alternative to conventional fabrication methods.

Figure 5:
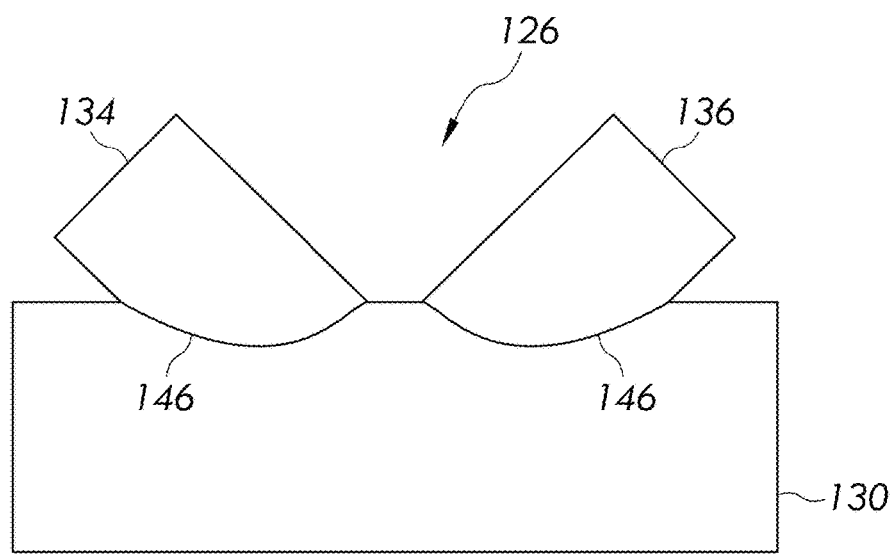
FIG. 5 schematically shows a conventional K joint.

FIG. 5 schematically shows a conventionally-formed (e.g., manually welded) K joint 126. The weld 146 between the chord member 130 and brace members 134, 136 is saddle-shaped, and the ends of the brace members must be cut to shape accordingly. The labor-intensive manual fabrication of a TKY joint can require the following steps, some or all of which may be eliminated by forming the joint using metal additive manufacturing. The pipe sections 130, 134, 136 must initially be cut to length and beveled and delivered to a work station. Using a crane and multiple personnel, the pipe sections 130, 134, 136 are then fit-up and the brace members tack welded to the chord member. Inside welding is then performed between the brace members 134, 136 and the chord member 130. The welds 146 can be back gouged from the outside to clean the metal, and the large bullet tacks holding the brace members 134, 136 to the chord member 130 removed. Outside welding is then performed between the brace members 134, 136 and the chord member 130 to complete the welds 146. Finish grinding to optimum geometry 360°, which is critical in plane XX, YY, and ZZ to achieve specific stress concentration limits, is then performed on the welds 146. The welds 146 would then be inspected, such visually with tools to check dimensional accuracy of the final weld, by radiographic testing (RT), ultrasonic testing (UT), or other testing methods. The welds 146 would then be reworked as needed.

Figure 6:
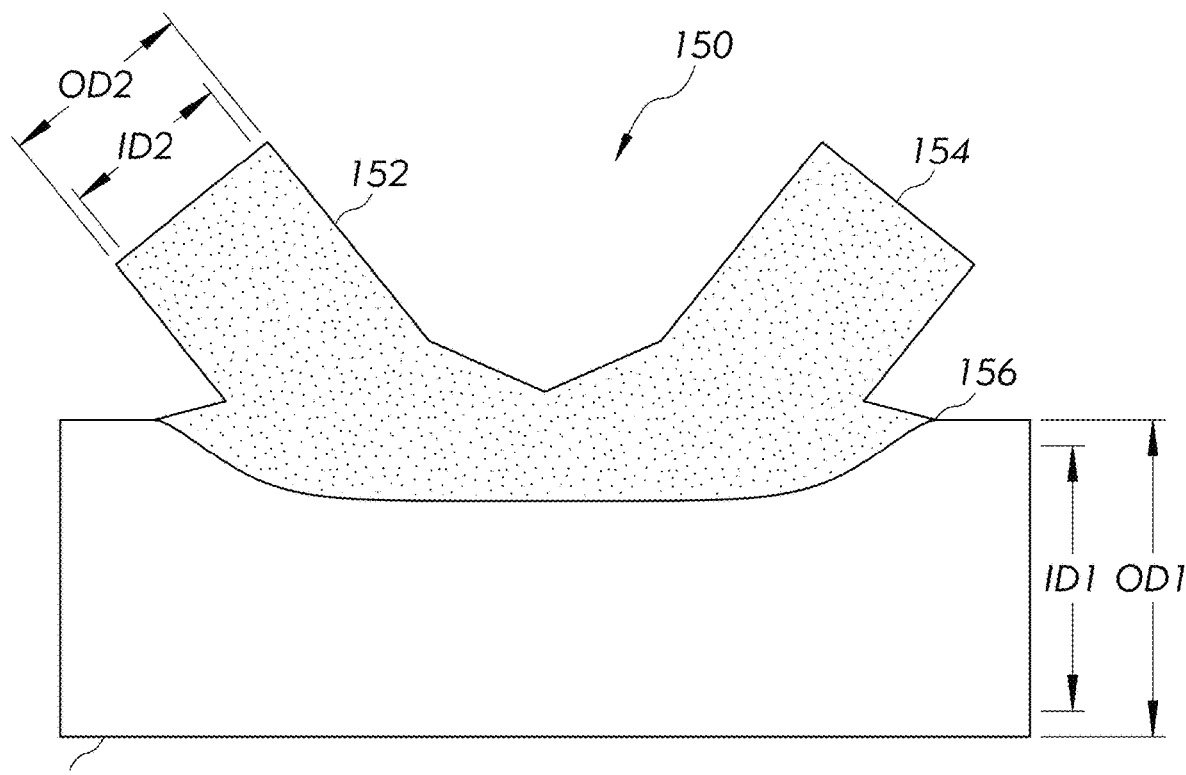
FIG. 6 schematically shows an additively manufactured K joint.

FIG. 6 schematically shows an additively manufactured or 3D printed K joint 150. The chord member 130 is a section of tube or pipe that used as a tubular substrate upon which the brace members 152, 154 are additively manufactured. The chord and brace members are generally cylindrically shaped, having a circular cross-section, in particular at their distal ends. The chord member 130 can have an outer diameter OD1 and inner diameter ID1 that is larger than the outer diameter OD2 and inner diameter ID2 of the brace members 152, 154 as shown. The outer and inner diameters of the brace members 152, 154 could be equal in size or larger than the chord member 130 if desired. The brace members 152, 154 are built up layer by layer from the chord member 130 by additive manufacturing. The brace members 152, 154 are connected to the chord member 130 at their respective proximal ends. The brace members 152, 154 can be integrally formed (e.g., formed together and share common structural elements). For example, the brace members 152, 154 can be additively manufactured simultaneously and portions of their outer surface or tubular walls can be joined together and shared between the two braces.

The attachment area 156 between the base of the brace members 152, 154 and the chord member 130 need not be saddle shaped, but could have various shapes and cross-sectional contours to achieve a desired joint strength and/or optimized minimal stress concentrations that may exceed industry standards for fatigue performance per industry accepted codes such as those promulgated by DNV (Det Norske Veritas) and ABS (American Bureau of Shipping). In particular, the attachment area 156 can be designed to reduce or minimize stress concentrations within the K joint 150. For example, the attachment area 156 could include strengthening gussets or fillets or the wall thickness of the brace members 152, 154 could be increased at the attachment area to improve stress concentrations in the joint 150. At the distal ends of the brace members 152, 154 (opposite the attachment area 156), the outer surfaces of the brace members can be cylindrically-shaped and have a circular cross-sectional shape that matches other structural members to which the joint 150 will be attached. The cross-sections of the brace members 152, 154 at their distal ends could also be square-shaped, rectangular, etc. In order to improve the stress concentrations within the joint 150 and to strengthen the joint, the outer surfaces of the brace members 152, 154 at their proximal ends (e.g., at the attachment area 156) can have noncircular cross-sectional shapes. Additionally or alternatively, the wall thicknesses of the brace members 152, 154 at the attachment area 156 can be greater than the wall thicknesses at their distal ends. The wall thickness of the brace members 152, 154 at their proximal ends (e.g., at the attachment area 156), and even extending upward toward their distal ends, can be non-uniform along the outer periphery of the brace members, to provide stronger and weaker portions of the brace members. For example, portions of the brace members 152, 154 that will be most subject to stress can have thicker walls than other portions. As shown in FIG. 6, respective portions of the outer surfaces and walls of the brace members 152, 154 at the attachment area 156 can be flared outward to strengthen the attachment area. The geometry and shape of the additive deposition, in particular at the attachment area 156, can be optimized to reduce stress concentration factors and reduce the weight of the brace 152, 154 and chord 130 members. Improving or reducing stress concentrations in the joint 150 can lead to increased fatigue life performance of the corresponding structure (e.g., a jacket) by reducing the stress concentration factors (K-factors) throughout the structure and may allow for the use of thinner-walled pipe in the structure, thereby reducing significantly the overall material costs to build the structural jacket. This can extend the life of the structure and reduce the need for heavier structural cross members and connections, thereby providing an overall weight reduction to support the design loads.

A TKY joint can be additively manufactured to near net shape. The near net shape TKY joint can be used as printed, or be subsequently machined, such as by multiple access milling and grinding tools including CNC (computer numeric control) and robotics, to achieve a final surface finish, dimensions, and stress concentration factor (K-factor) if desired. In particular, the TKY joint can be additively manufactured and then stress concentrations within the joint, such as stress concentrations within the brace members 152, 154, can be adjusted by machining portions of the outer surfaces of the braces and/or the chord 130. For example, the geometry of portions of the TKY joint, such as additively manufactured portions and/or the substrate, can be changed by machining to reduce or minimize stress concentrations. However, the additively manufactured TKY joint may not require additional machining, this is determined by the particular end user requirements, which may further reduce the time of manufacturing of the jacket foundation.

After additively manufacturing a TKY joint, the joint can be nondestructively tested prior to delivery and installation. The additive printed TKY joint will be dimensionally accurate to the designers print. Once the TKY joint is formed, it can be welded to main pipe sections of the overall structure (e.g., jacket) that forms the completed chords and braces of the structure using manual or automated welding techniques. For example, the additively manufactured TKY joints can be attached to main pipe or tubular sections using semi-automatic or robotic orbital welding equipment. It is to be appreciated that much manual welding can be eliminated when constructing structural jackets using additively manufactured TKY joints. This can significantly reduce the overall fabrication time of the jackets, delivering the final jacket with thousands of man hours reduced.

Figure 7:
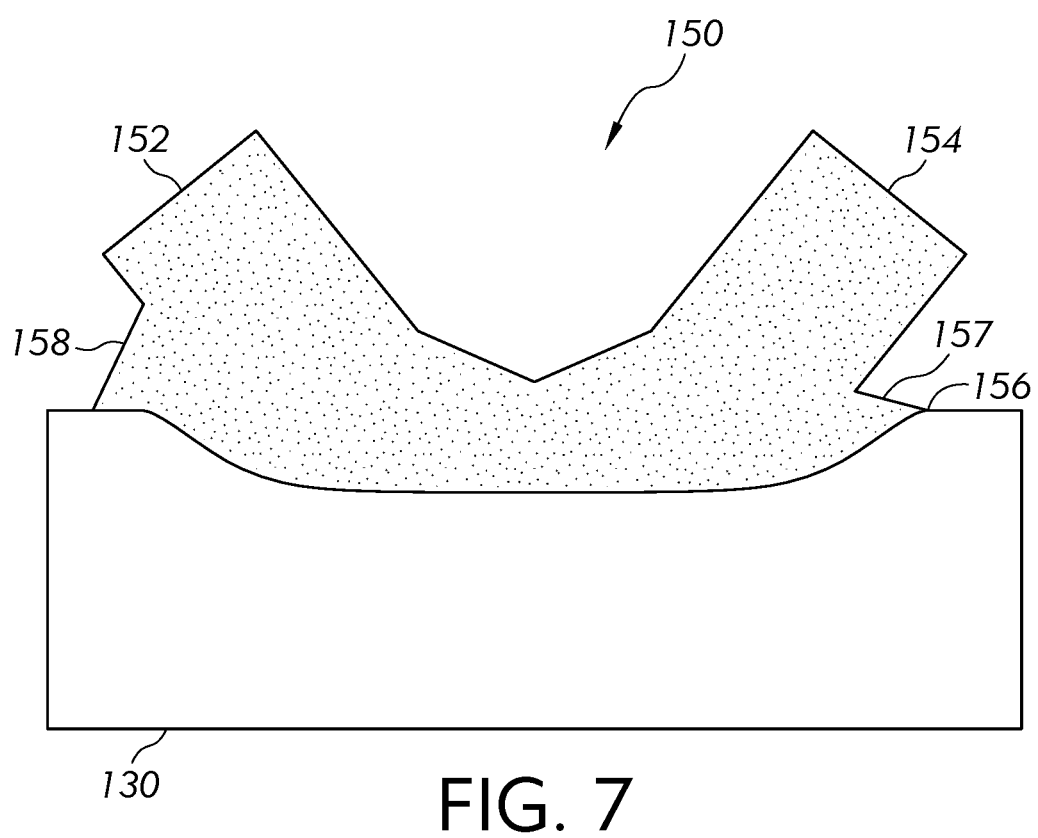
FIG. 7 schematically shows an additively manufactured K joint.

Referring to FIG. 7, as the brace members 152, 154 are printed or built up on the chord 130, strengthening structures can be integrally formed with the brace members, to strengthen the joint at the proximal ends of the braces. Example strengthening structures can include the thicker wall or flared portions of the braces 152, 154, a strengthening fillet 157, a strengthening gusset 158, and the like.

The consumables used to create the TKY joint can be welding electrodes. The consumables could also be electrodes having a composition that facilitates additive manufacturing. For example, the consumables could have properties that minimize the presence of contaminants and undesirable elements between individual layers that form a near net shape part build up. The consumables could also provide an optimized surface finish for continuous printing performance of the TKY joint, requiring little to no interpass cleaning. The consumables could also provide desired characteristics to the TKY joint, such as a particular mechanical strength, corrosion resistance, impact toughness, fracture toughness, hardness or ductility that has an improvement effect on the overall TKY node performance, not possible with other conventional welding electrodes or consumables. The metal or alloy used to create the TKY joint can be different from the metal composition of the substrate (chord member 130) and/or the metal composition of the weld metal that joins the TKY joint to main brace/chord sections of the jacket. Portions of the additively manufactured TKY joint can have different metallic compositions than other portions of the joint. For example, an outer surface of the joint can be more corrosion resistant than an inner surface of the joint, or the metal composition of some portions of the joint can be stronger or tougher than other portions of the joint. In certain embodiments, multi-wire additive manufacturing employing two or more wires simultaneously can be used to create the TKY joint. The two or more wires can have the same composition or different compositions to create the desired final deposited weld metal alloy or printed properties for the TKY joint.

Figure 8:
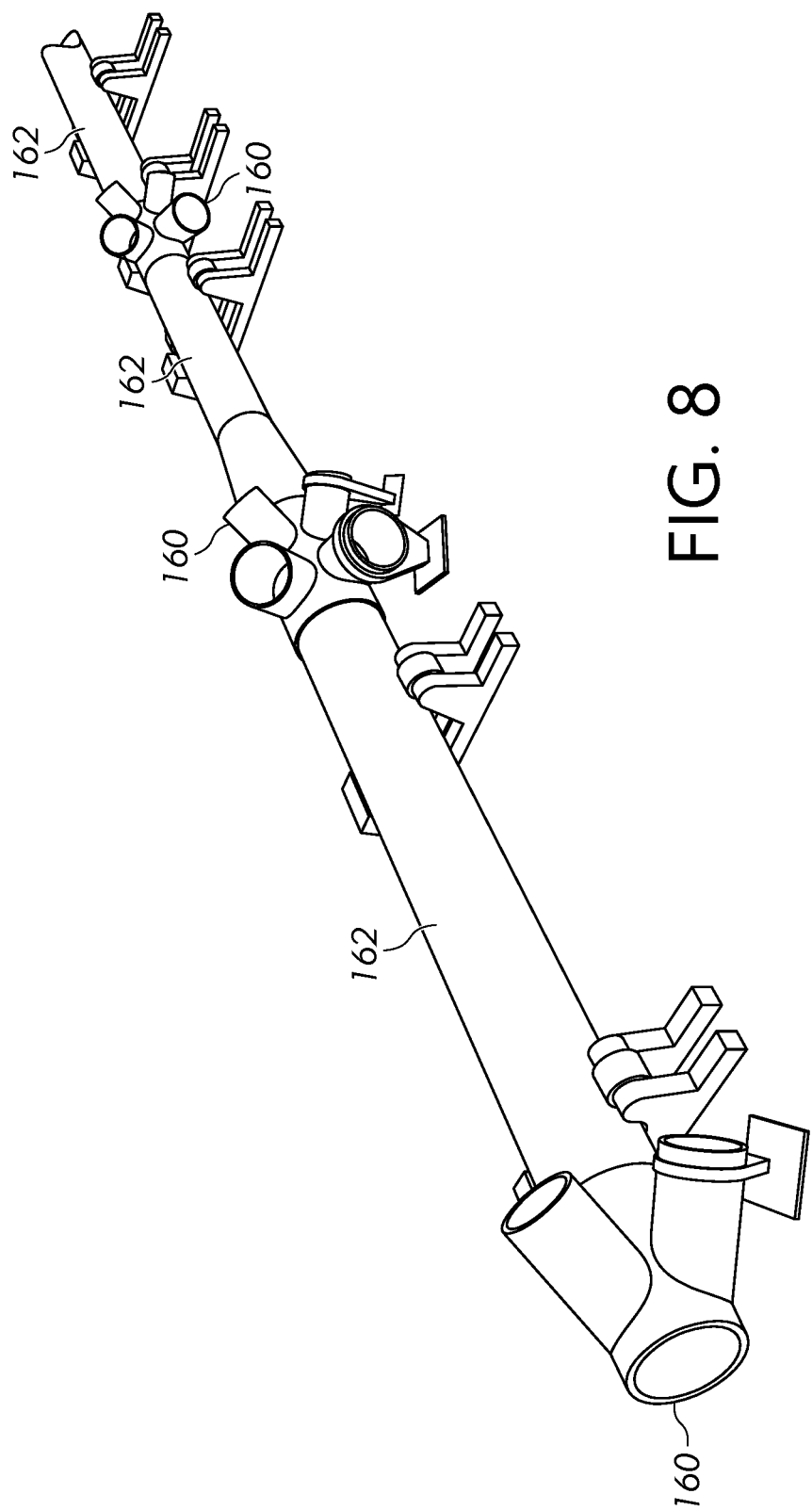
FIG. 8 shows additively manufactured TKY joints attached to additional structural tubes.

FIG. 8 shows additively manufactured TKY joints 160 attached to other structural members, such as chord members 162, along an assembly line of joints and chords. The substrate of each TKY node 160 can be the same type of pipe as the chords 162. For example, the substrate can be cut from a section of pipe used for the chord members 162. The stubs (e.g., brace members) that extend from the substrate are additively manufactured or 3D printed as described above. The TKY nodes 160 can be welded to the chord members 162 and/or brace members using manual or automated welding operations.

Figure 9:
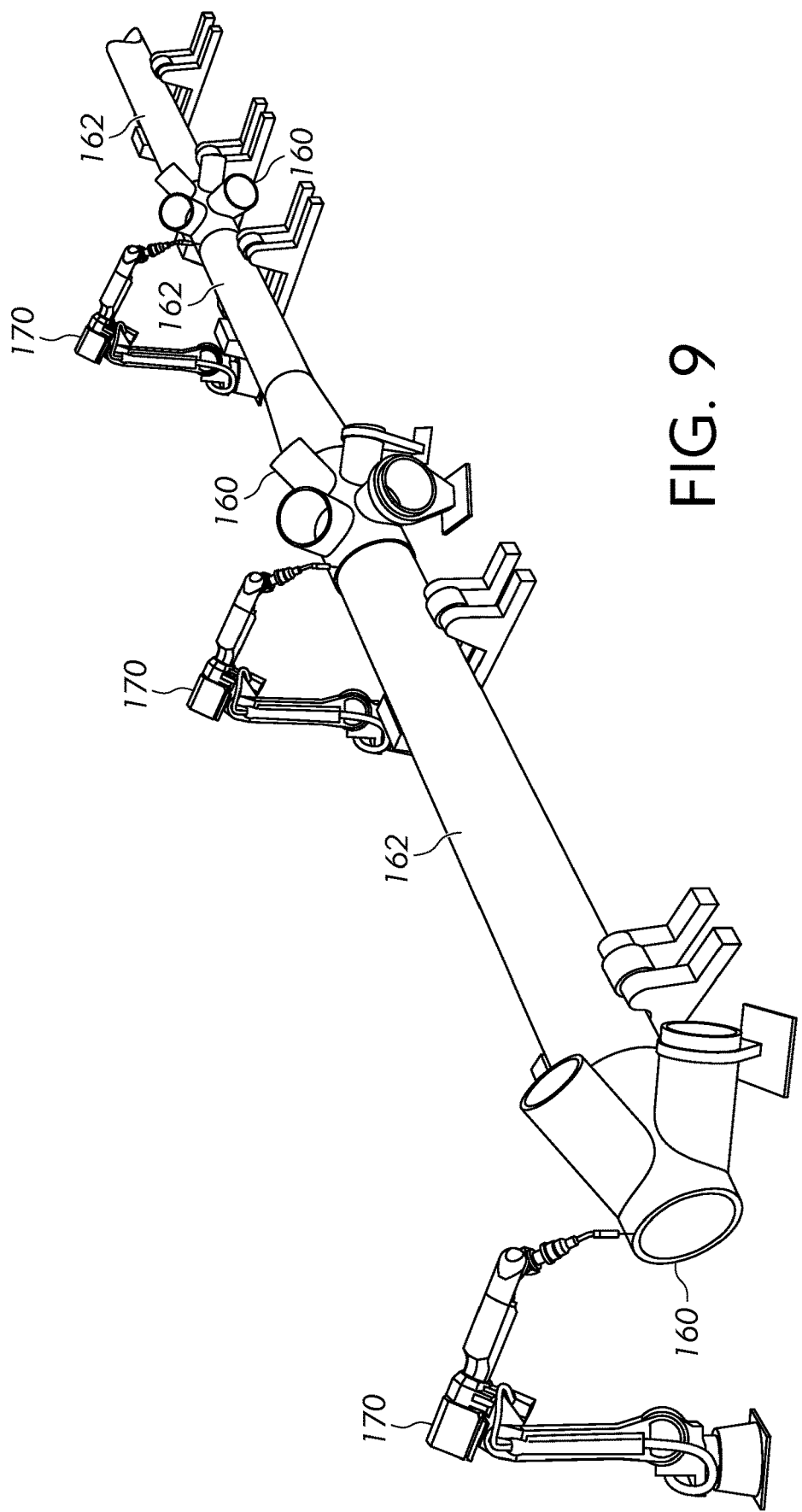
FIG. 9 shows additively manufactured TKY joints attached to additional structural tubes.

The entirety of the TKY joints 160 including their chord and brace members, or some portions of the TKY joints (e.g., the brace members) can be additively manufactured on the ends of longer tubular members of a jacket structure. FIG. 9 shows multiple welding robots 170 additively manufacturing TKY joints 160 on the ends of and between chord members 162. The TKY joints 160 can be 3D printed simultaneously or sequentially by one or more robots 170, and the TKY joints can have different numbers of brace members. For example, a TKY joint having only two brace members can be 3D printed simultaneously with a TKY joint having four brace members. Although FIG. 9 shows chord members 162 with attached TKY joints, it is to be appreciated that the TKY joints could also be additively manufactured on the ends of brace members of a jacket structure. The additive manufacturing apparatus is integrated into positioning equipment which may print one TKY joint or node or multiple nodes at one time with robotics along an entire branch or chord of the jacket foundation. These movements can be synchronized or unsynchronized and rely on the system's ability to coordinate the motion of all components to produce the desired final node configuration.

Figure 10:
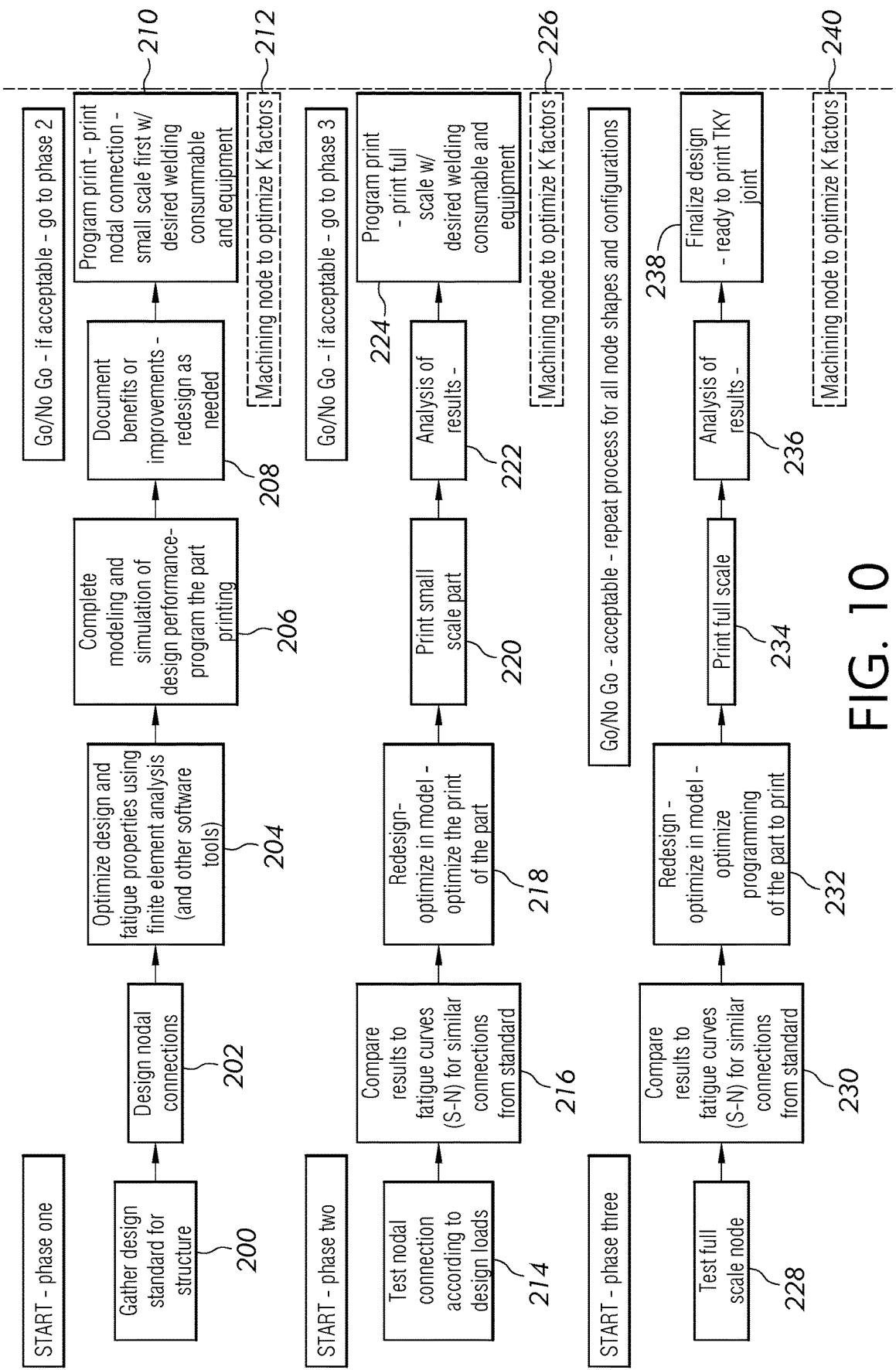
FIG. 10 shows an example sequence of steps in a method for designing and manufacturing a 3D printed TKY joint.

FIG. 10 shows an example sequence of steps in a method for designing and manufacturing a 3D printed TKY joint. Initially, the various requirements or design standards for the structure and TKY joints are gathered (step 200). The nodal connections are then designed (step 202). Finite element analysis and/or other software tools can be used to optimize the design of the TKY joints and their fatigue or stress concentration properties (step 204). Modeling and simulation of the design performance of the joints can be completed and a program for printing the joints generated (step 206). Benefits or improvements of the joint design can be documented, and the joint redesigned as needed (step 208). If desired, a small scale model of the joint can be additively manufactured for testing using an appropriate additive welding consumable and welding equipment (step 210). The model of the joint can be machined to optimize stress concentrations or K-factors (step 212). The small scale model can then be tested according to designed loads (step 214). Results of the tests can be compared to standard fatigue curves (S-N) for similar connections (step 216). If needed, the model of the joint can be redesigned (step 218) and printed again (step 220). Further analysis of the redesigned model of the joint can be performed (step 222) and then a full scale joint additively manufactured for testing using an appropriate additive welding consumable and welding equipment (step 224). The full scale joint can be machined to optimize stress concentrations or K-factors (step 226). The full scale joint can then be tested according to designed loads (step 228). Results of the tests can be compared to standard fatigue curves (S-N) for similar connections (step 230). If needed, the joint can be redesigned (step 232) and printed again (step 234). Further analysis of the redesigned joint can be performed (step 236) and then a final design of the TKY joint printed (step 238). The final joint can be can be machined to optimize stress concentrations or K-factors (step 240).

Figure 11:
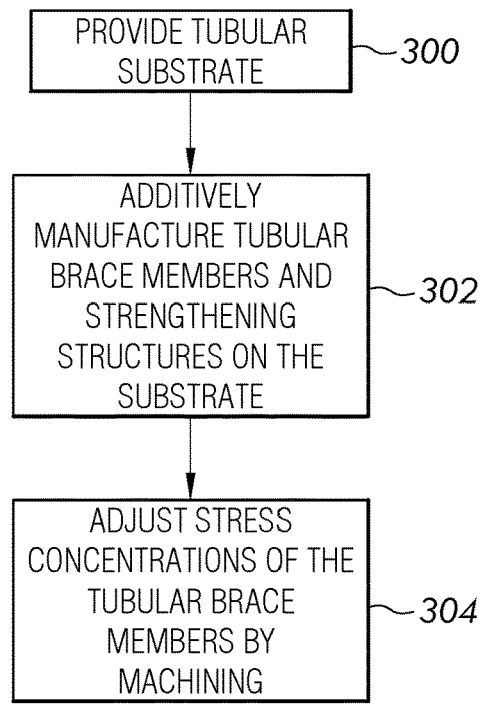
FIG. 11 shows a flow diagram for a method of fabricating a tubular joint such as a TKY joint.

FIG. 11 shows a flow diagram of an example method of fabricating a tubular joint, such as a TKY joint, by 3D printing. Initially, a tubular substrate is provided (step 300). The tubular substrate can extend along an axis have larger inner and outer diameters than the brace members to be printed thereon. The tubular brace members are additively manufactured or 3D printed on the substrate (step 302). Strengthening structures such as gussets or fillets can be integrally formed with the brace members while the brace members are printed. Once the brace members are additively manufactured on the substrate, stress concentrations of the brace members can be adjusted by machining, in particular by machining the outer surfaces of the brace members.

Figure 12:
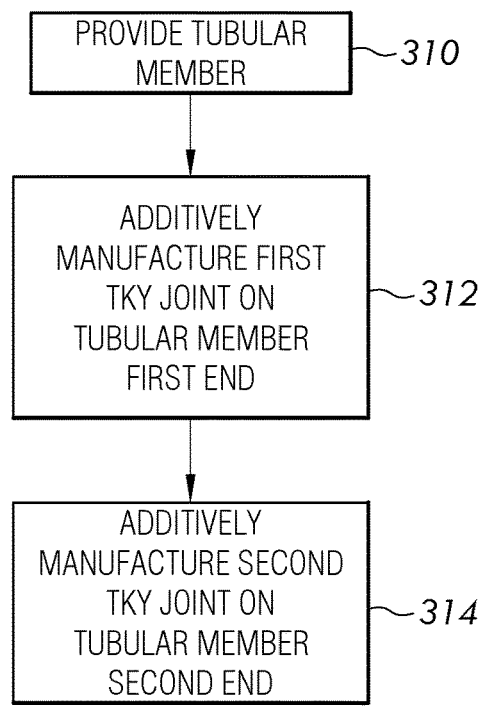
FIG. 12 shows a flow diagram for a method of fabricating a jacket structure.

FIG. 12 shows a flow diagram of an example method of fabricating a jacket structure. Initially, a tubular member of the jacket structure, such as a chord or brace, is provided (step 310). The tubular member extends from a first end to a second end. A first TKY joint is additively manufactured on the first end of the tubular member (step 312). A second TKY joint is additively manufactured on the second end of the tubular member (step 314). The step of additively manufactured the first TKY joint and the step of additively manufacturing the second TKY joint can occur simultaneously. The first TKY joint can include a first number of tubular brace members and the second TKY joint can include a second number of tubular brace members. The first number of tubular brace members can the same as the second number of tubular brace members or different (e.g., greater or less than the second number of tubular brace members).

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of fabricating a tubular joint, comprising the steps of:
providing a tubular substrate extending along an axis, wherein the tubular substrate has a first inner diameter;
additively manufacturing, by a welding robot, a first tubular brace member on the tubular substrate, wherein the first tubular brace member is attached to the tubular substrate at a proximal end of the first tubular brace member, and wherein at a distal end of the first tubular brace member, the first tubular brace member has a second inner diameter that is smaller than the first inner diameter; and
additively manufacturing, by the welding robot, a second tubular brace member on the tubular substrate simultaneously with additively manufacturing the first tubular brace member, wherein the second tubular brace member is attached to the tubular substrate at a proximal end of the second tubular brace member,
wherein, at said distal end of the first tubular brace member, the first tubular brace member has a first wall thickness and an outer surface having a circular cross-sectional shape, and at said proximal end of the first tubular brace member, the first tubular brace member has a second wall thickness that is greater than the first wall thickness.

2. The method of claim 1, further comprising the step of adjusting a stress concentration of the additively manufactured first tubular brace member by machining the outer surface of the additively manufactured first tubular brace member and thereby changing a geometry of a portion of the tubular joint.

3. The method of claim 1, wherein the second wall thickness is non-uniform along an outer periphery of the tubular brace member.

4. The method of claim 1,
wherein a wall thickness of the second tubular brace member is greater at the proximal end of the second tubular brace than at a distal end of the second tubular brace member.

5. The method of claim 4, further comprising the step of adjusting stress concentrations of the additively manufactured first tubular brace member and the additively manufactured second tubular brace member by machining the outer surface of the additively manufactured first tubular brace member and machining an outer surface of the additively manufactured second tubular brace member and thereby changing a geometry of a portion of the tubular joint.

6. The method of claim 4, wherein the first tubular brace member is integrally formed with the second tubular brace member.

7. The method of claim 1, wherein said proximal end of the first tubular brace member includes an additively manufactured strengthening gusset integrally formed with the first tubular brace member.

8. The method of claim 1, wherein said proximal end of the first tubular brace member includes an additively manufactured strengthening fillet integrally formed with the first tubular brace member.

9. The method of claim 1, wherein the first tubular brace member and the second tubular brace member extend along respective axes that form acute or obtuse angles with said axis along which the tubular substrate extends.

10. A method of fabricating a tubular joint, comprising the steps of:

providing a tubular substrate extending along an axis, wherein the tubular substrate has a first inner diameter;

providing a robot having an electric arc torch;

additively manufacturing, by the robot, a first tubular brace member on the tubular substrate, wherein the first tubular brace member is attached to the tubular substrate at a proximal end of the first tubular brace member, and wherein at a distal end of the first tubular brace member, the first tubular brace member has a second inner diameter that is smaller than the first inner diameter;

additively manufacturing, by the robot, a second tubular brace member on the tubular substrate simultaneously with additively manufacturing the first tubular brace member, wherein the second tubular brace member is attached to the tubular substrate at a proximal end of the second tubular brace member;

adjusting a stress concentration of the additively manufactured first tubular brace member by machining an outer surface of the additively manufactured first tubular brace member and thereby changing a geometry of a first portion of the tubular joint; and adjusting a further stress concentration of the additively manufactured second tubular brace member by machining an outer surface of the additively manufactured second tubular brace member and thereby changing a geometry of a second portion of the tubular joint.

11. The method of claim 10, wherein the first tubular brace member is integrally formed with the second tubular brace member.

12. The method of claim 10, wherein said proximal end of the first tubular brace member includes an additively manufactured strengthening gusset integrally formed with the first tubular brace member.

13. The method of claim 10, wherein said proximal end of the first tubular brace member includes an additively manufactured strengthening fillet integrally formed with the first tubular brace member.

* * * * *